US009393832B2

(12) United States Patent
Debien

(10) Patent No.: US 9,393,832 B2
(45) Date of Patent: Jul. 19, 2016

(54) WHEEL OF THE SPOKED BICYCLE WHEEL TYPE, AND HUB WITH WHICH SAID WHEEL CAN BE FITTED

(75) Inventor: Michel Debien, Mornac (FR)

(73) Assignee: MDPW, Pau (FR)

( * ) Notice: Subject to any disclaimer, the term of this patent is extended or adjusted under 35 U.S.C. 154(b) by 0 days.

(21) Appl. No.: 14/391,223

(22) PCT Filed: Aug. 27, 2012

(86) PCT No.: PCT/FR2012/051937
§ 371 (c)(1),
(2), (4) Date: Oct. 8, 2014

(87) PCT Pub. No.: WO2013/156692
PCT Pub. Date: Oct. 24, 2013

(65) Prior Publication Data
US 2015/0137583 A1    May 21, 2015

(30) Foreign Application Priority Data
Apr. 20, 2012    (FR) ...................................... 12 01178

(51) Int. Cl.
*B60B 1/02* (2006.01)
*B60B 1/04* (2006.01)
*B60B 1/00* (2006.01)
*B60B 27/02* (2006.01)

(52) U.S. Cl.
CPC ................. *B60B 1/023* (2013.01); *B60B 1/003* (2013.01); *B60B 1/006* (2013.01); *B60B 1/0238* (2013.01); *B60B 1/0253* (2013.01); *B60B 1/042* (2013.01); *B60B 27/023* (2013.01); *B60B 1/0276* (2013.01); *B60B 2900/111* (2013.01); *B60B 2900/50* (2013.01); *B60Y 2200/13* (2013.01)

(58) Field of Classification Search
CPC ....... B60B 1/02–1/215; B60B 1/0223–1/0238; B60B 1/04–1/043
See application file for complete search history.

(56) References Cited

U.S. PATENT DOCUMENTS

| 1,067,296 | A  | * | 7/1913 | Andresen | .................. B60B 9/26 152/75 |
| 6,231,128 | B1 | * | 5/2001 | Okajima | ............... B60B 1/0223 301/104 |
| 2009/0160243 | A1 | * | 6/2009 | Mercat | .................... B60B 1/003 301/75 |

FOREIGN PATENT DOCUMENTS

EP    1 122 091 A2    8/2001
FR    391 497 A    11/1908

(Continued)

OTHER PUBLICATIONS

International Search Report, dated Jan. 17, 2013, from corresponding PCT application.

*Primary Examiner* — Jeffrey J Restifo
*Assistant Examiner* — Erez Gurari
(74) *Attorney, Agent, or Firm* — Young & Thompson

(57) ABSTRACT

A wheel of the bicycle wheel type includes a rim (200), a hub (10) with an axis (100) corresponding to the axis of the wheel, the hub including a left flange (11) and a right flange (12). The wheel includes an arrangement of rim-hub-rim connecting elements on at least one flange of the hub, which includes at least two sets of at least two rim-hub-rim connecting elements ((51-52; 53-54); (55-56; 57-58)), in the form of opposing spokes or rods, and in which the elements of each set are in planes situated on either side of the axis of the wheel and parallel to the axis.

7 Claims, 6 Drawing Sheets

(56) References Cited

FOREIGN PATENT DOCUMENTS

| FR | 520 160 A | 6/1921 |
| FR | 2 640 203 A1 | 6/1990 |
| WO | 2004/101294 A1 | 11/2004 |
| WO | 2007/075735 A2 | 7/2007 |

\* cited by examiner

WHEEL OF THE SPOKED BICYCLE WHEEL TYPE, AND HUB WITH WHICH SAID WHEEL CAN BE FITTED

BACKGROUND OF THE INVENTION

1. Field of the Invention

The invention relates to a wheel of the spoked bicycle wheel type and the hub with which said wheel can be equipped.

The invention applies to bicycle wheels or to any means of locomotion comprising wheels with spokes.

2. Description of the Related Art

Conventionally, a bicycle wheel comprises a rim, a hub with an axle corresponding to the axle of the wheel, as well as an arrangement of spokes allowing the rim to be connected to the hub, the spokes being fixed at one of their ends to the left and right flanges (or edges) of the hub and at the other end to the inner perimeter of the rim. The spokes make it possible to confer rigidity to the wheel and to transmit the torque exerted on the axle when the cyclist is pedaling. The arrangement of the spokes is conventionally the same on each flange of the hub, but it can be different, particularly for the rear wheel. It is in fact known today, to improve performance, for example for racing bicycles, that the rear wheel comprises a different arrangement of spokes on each flange of the hub.

There exist today two types of spoke arrangements, a so-called radial spoking and a so-called tangential spoking.

In radial spoking, the spokes are arranged perpendicular to the axle toward the rim. And no spoke crosses another. The advantage of radial spoking is simplicity of assembly and especially weight saving because the spokes are shorter. But the wheel is less comfortable because impacts are transmitted radially. This spoking is found only on the front, non-driving wheels, and with braking at the rim. Radial spoking is not used on a rear wheel, because the pedaling torque would shear the spoke at its head.

In tangential spoking, the spokes extend tangentially to the hub, some to the left, some to the right, and do cross over one another. With tangential spoking, power is transmitted by one-half of the spokes.

Thus radial spoking, with spokes not crossing and perpendicular to the hub, makes it possible to obtain a very light (little matter) and vertically very rigid wheel, to the detriment of comfort and flexibility.

To effectively transmit torque from the hub to the rim, however, as is the case with driving wheels or wheels with disk or drum brakes, it is necessary, for better longevity, to have an inclined arrangement of spokes on the flanges of the hub. This allows better torque capacity (but minimal vertical rigidity).

To improve the performance of bicycles, manufacturers have made bicycles lighter by using materials that are mechanically very strong and at the same time lightweight for manufacturing frames. It is more and more common today to find bicycles made of light alloys such as aluminum alloys or titanium alloys, or carbon fibers.

With the aim of always improving the performance of bicycles, it is also known to lighten bicycles still further by equipping them with rims made of light alloys, aluminum or titanium alloys, or of carbon composite material.

BRIEF SUMMARY OF THE INVENTION

The problem that the applicant has sought to solve is that of improving the performance of bicycles. To resolve this problem, the applicant has searched in a direction other than that of lightening the frame or the wheels, while still not neglecting this aspect. Indeed, the applicant has sought to improve the performance of bicycles by orienting himself toward an improvement in the efficiency of the wheels themselves by means of novel structures. The applicant has discovered, at the conclusion of this research, that a particular arrangement of spokes made it possible to improve the efficiency by more than 4% compared to the result obtained with existing wheels, that is, for the same force exerted by the cyclist, a bicycle equipped with wheels according to the present invention has an efficiency more than 4% greater. Torque measurements have been made with the present invention and revealed an improvement in efficiency ranging from 4% to 8% compared to existing bicycle wheels, and particularly compared to spoked wheels.

The problem was resolved by means of a wheel of the spoked bicycle wheel type including a new arrangement of elements connecting the rim and the hub, said arrangement comprising at least two sets of at least two rim-hub-rim connecting elements taking the form of opposing spokes or rods, located in planes parallel to the axle of the wheel and on either side of said axle.

According to one embodiment, the rim-hub-rim connecting elements form pairs of opposing spokes, one end whereof is attached to the rim and the other end whereof is attached to the hub.

According to another embodiment, the rim-hub-rim connecting elements consist of a continuous element consisting of a rod both ends whereof are attached to the rim and a median portion whereof is attached to the hub. In this embodiment, each rim-hub-rim connecting element consists of a single rod instead of two opposing spokes as in the first embodiment.

By opposing spokes is meant spokes which extend in 180° opposite directions from the hub toward the rim. The wheel is thus equipped with an arrangement of pairs of opposing spokes forming a 180° angle relative to a radial plane of the hub.

Hereafter, left flange and right flange mean respectively the left side and the right side of the hub.

The invention has more particularly as its object a wheel of the bicycle wheel type including a rim, a hub with an axle corresponding to the axle of the wheel, said hub comprising a left flange and a right flange, characterized mainly in that it further comprises an arrangement of rim-hub-rim connecting elements on at least one flange of the hub, said arrangement including at least two sets of at least two rim-hub-rim connecting elements, wherein said elements of each set are in planes located on either side of the axle of the wheel and parallel to said axle.

The ends of the spokes or of the rods attached to the rim are threaded to allow said spokes or rods to be attached and detached.

The hub comprises attachment means capable of cooperating with the spokes or the rods to make it possible to attach or detach said spokes or rods from the hub.

Advantageously, the wheel includes the same arrangement of rim-hub-rim connecting elements on the right and left flanges of the hub, but angularly offset about the axle of the wheel so that said elements are not facing one another.

According to a first example, an arrangement of rim-hub-rim connecting elements comprises two sets of at least two rim-hub-rim connecting elements.

According to a first example, an arrangement of rim-hub-rim connecting elements comprises three sets of at least two rim-hub-rim connecting elements.

Advantageously, each set includes two rim-hub-rim connecting elements.

Each rim-hub-rim connecting element consists of two distinct opposing spokes or of one continuous element connecting the hub to the rim at two points of attachment.

In a first variant embodiment, each set of at least two connecting elements of each flange consists of at least four opposing spokes in pairs and each having a first end attached to one or the other flange of the hub and a second end attached to the rim. The flange or both flanges can then consist of one part comprising a central portion placed on the axle of the wheel, having extensions in the form of vanes forming a cross, each vane having at its end opposite to the axle of the wheel at least two perforations designed for attachment of the opposing spokes. According to another example the flange or both flanges consist(s) of one part comprising a circular central portion, placed on the axle of the wheel, equipped with crossed vanes, each vane having on its periphery at least two perforations designed for attachment of the opposing spokes.

Advantageously, the four vanes or fins of the flanges are diametrically opposed.

In a second variant embodiment, each set of at least two connecting elements consists of extensions of said flange(s) of the hub, in the form of spokes tangential to the hub, opposed in pairs, and the ends whereof are attached to the rim. Advantageously, according to this example, the two flanges consist of a part comprising a central portion placed on the axle of the wheel, said circular part being equipped with said extensions on its periphery, which constitute the spokes.

According to the second exemplary embodiment, each set of at least two connecting element of one or the other flange consists of at least two rods, each rod having its ends attached at two points on the rim, and of a median portion attached to one flange and/or to the other flange of the hub.

According to another feature, the two flanges consist of a hexagonal part placed on the axle of the wheel and including, on its six edges, means for attaching the median portion of the rods, the wheel comprising, on the right and left flanges, three sets of two rods.

Advantageously, the hexagonal part comprises, on each edge, a groove allowing accommodation of the central portion of the rods and some glue for attaching said rods to the hub.

Advantageously, the wheel comprises on one side and/or both sides of the hub, additional spokes fixed to one and/or the other flange radially to the axle of the hub toward the rim.

According to another feature, the wheel comprises a rim, a hub, spokes or rods, all said elements being made of light alloy or carbon composite material.

Advantageously, the spokes and the rods are hollow tubes.

The invention also relates to a hub for a wheel according to the invention, comprising flanges with shapes having predetermined dimensions or a predetermined diameter allowing remote positioning of the connecting element relative to the axle of the wheel. The shapes and/or the dimensions of the flanges thus allow eccentric positioning of the connecting elements relative to the axle of the wheel and an arrangement of the opposing spokes on either side of the axle or positioning of the rods on either side of the axle at a predetermined distance from said axle.

According to another feature of the invention, the arrangement described is designed to allow disassembling and consequently changing or repairing the parts constituting it, and in particular the rim, the spokes or rods and the hub.

Such disassembly and repair can be carried out including the case where, in implementing a wheel conforming to this invention, this wheel is made of light alloy or of composite material such as for example carbon composite material.

BRIEF DESCRIPTION OF THE DRAWINGS

Other features and advantages of the invention will appear clearly upon reading the description which is made hereafter and which is given by way of an illustrative and non-limiting example and with reference to the figures wherein.

DETAILED DESCRIPTION OF THE PREFERRED EMBODIMENTS

Figure 1:
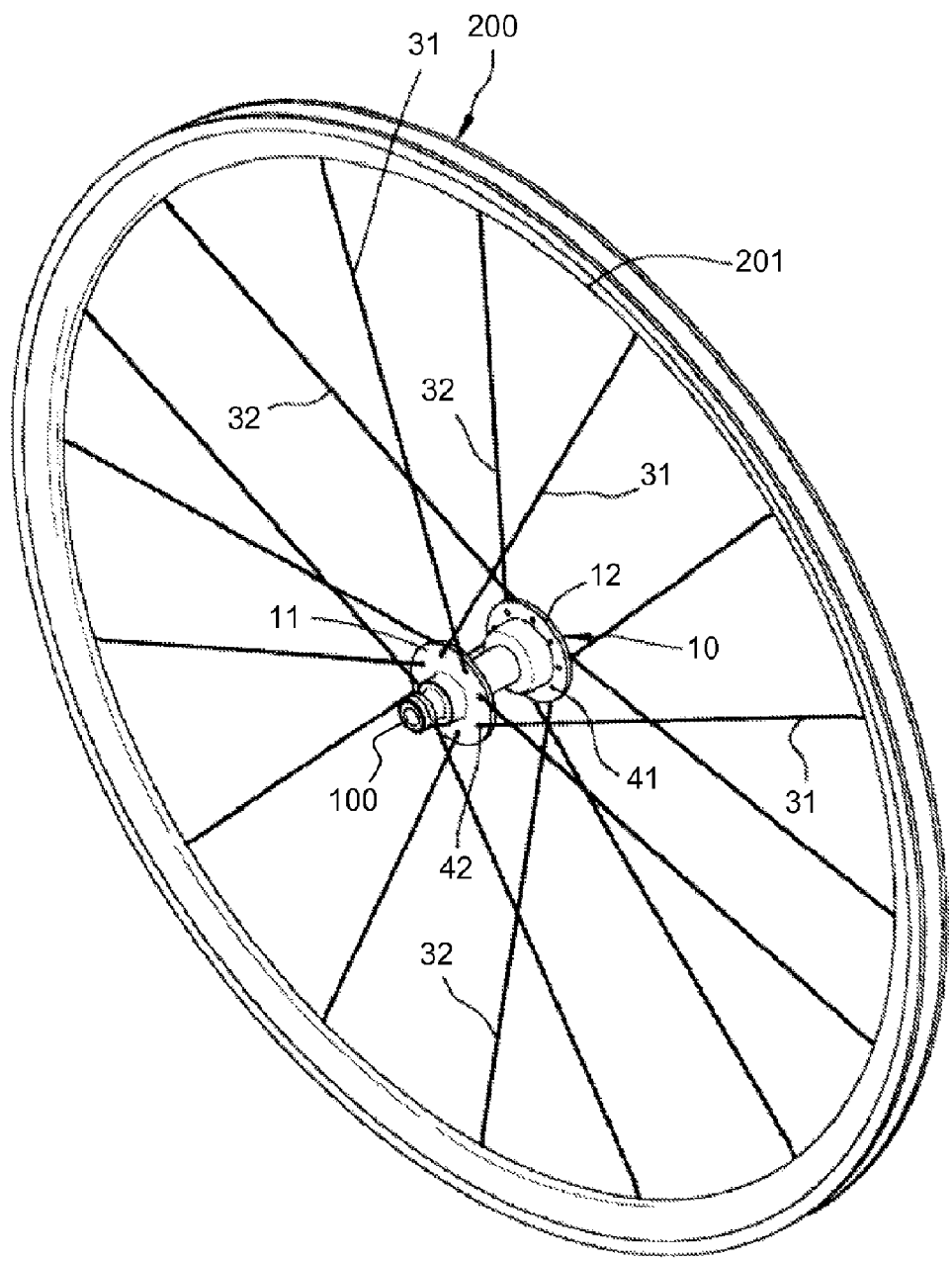
FIG. 1 shows schematically a prior art bicycle wheel.

By convention, the left side designates the foreground in the figures, and the right side is the background.

Moreover, the same elements shown in the figures have the same reference symbols.

In all the examples and variant embodiments of the invention, the wheel includes a rim 200, a hub 10 with an axle 100 corresponding to the axle of the wheel. The hub comprises a left flange 11 and a right flange 12. The wheel further comprises an arrangement of rim-hub-rim connecting elements on both flanges of the hub.

Figure 2:
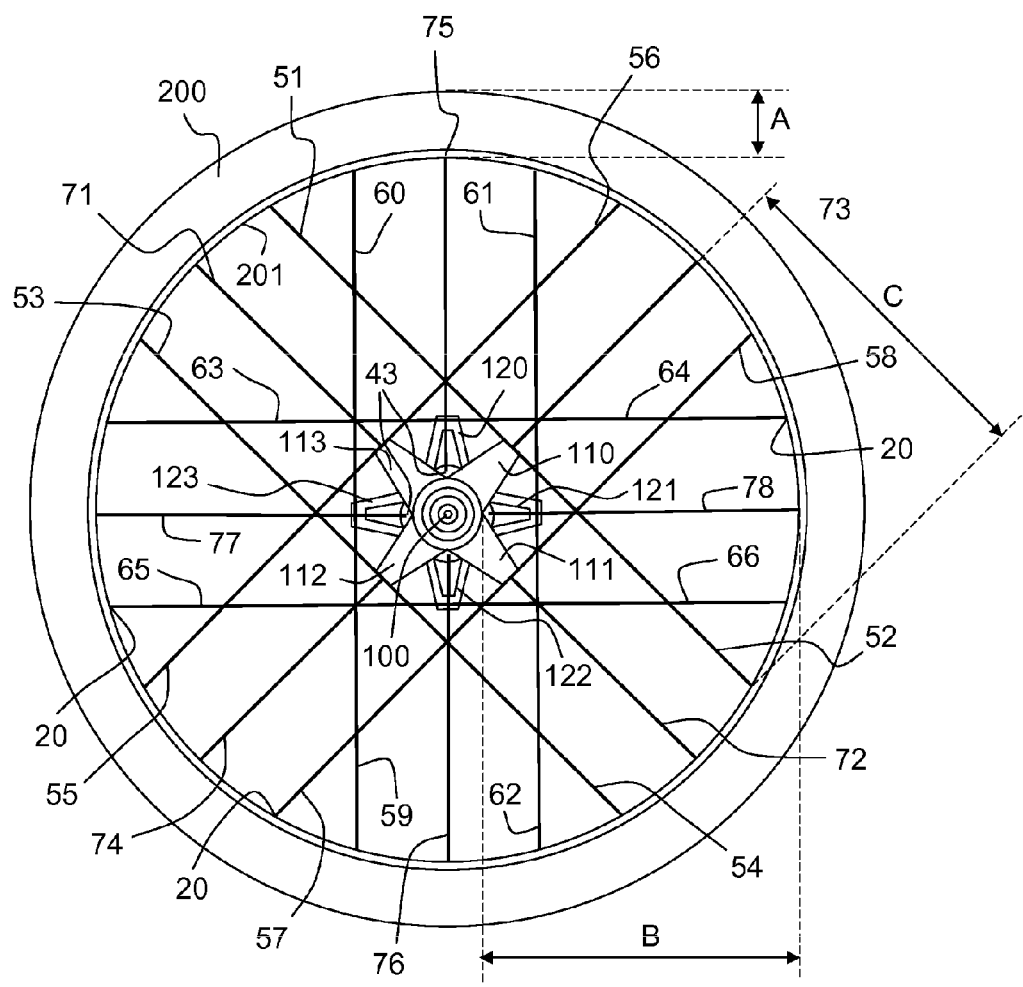
FIG. 2 shows schematically, in front view, a bicycle wheel according to a first example of the invention.
Figure 3:
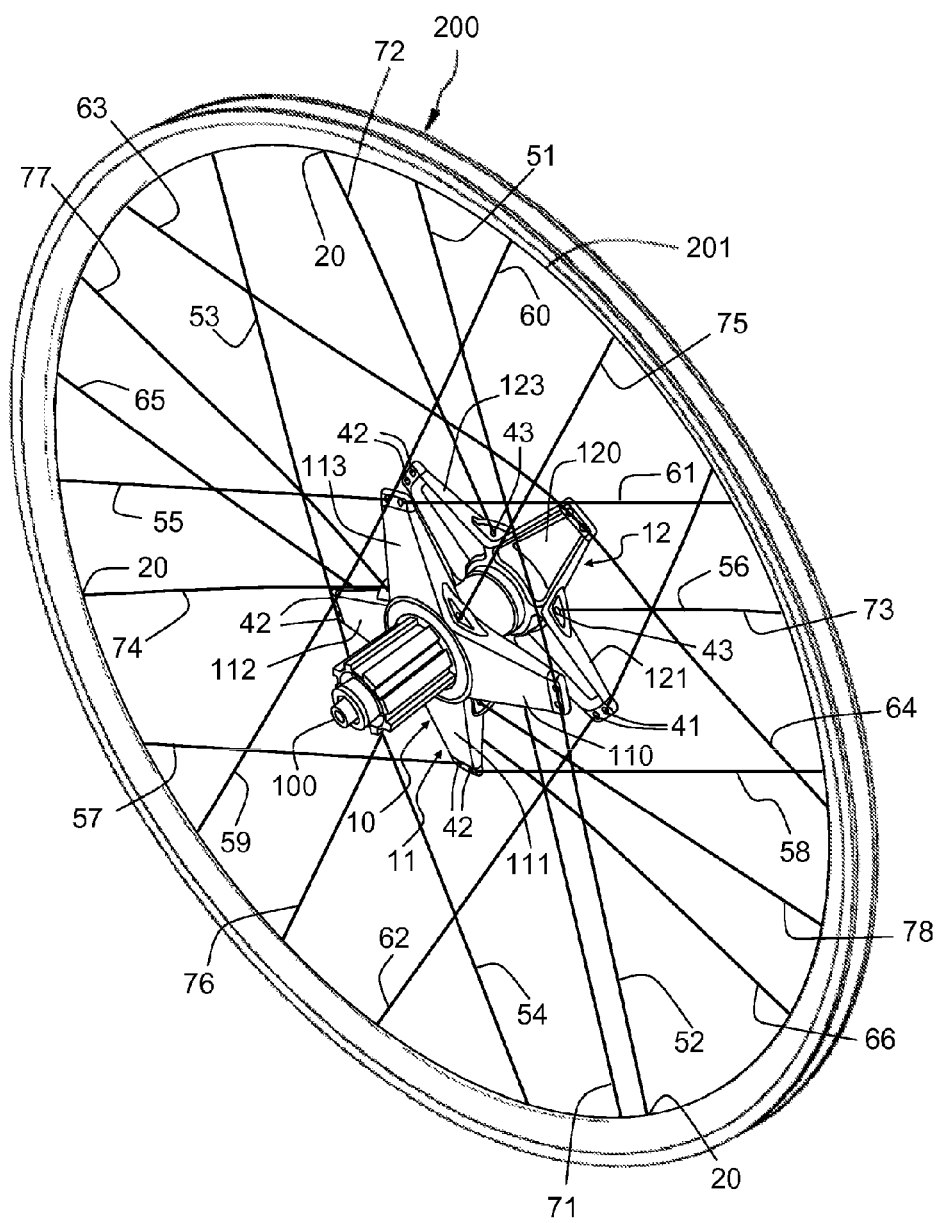
FIG. 3 shows schematically, in perspective view, a wheel according to the invention.

In the example illustrated by FIGS. 2 and 3, the arrangement includes two sets of two rim-hub-rim connecting elements, wherein said connecting elements of each set are in planes located on either side of the axle of the wheel and parallel to said axle and wherein each rim-hub-rim connecting element includes two opposing spokes each having one end attached to the rim and one end attached to the hub. The spokes are coaxial with one another in directions 180° apart.

Figure 7:
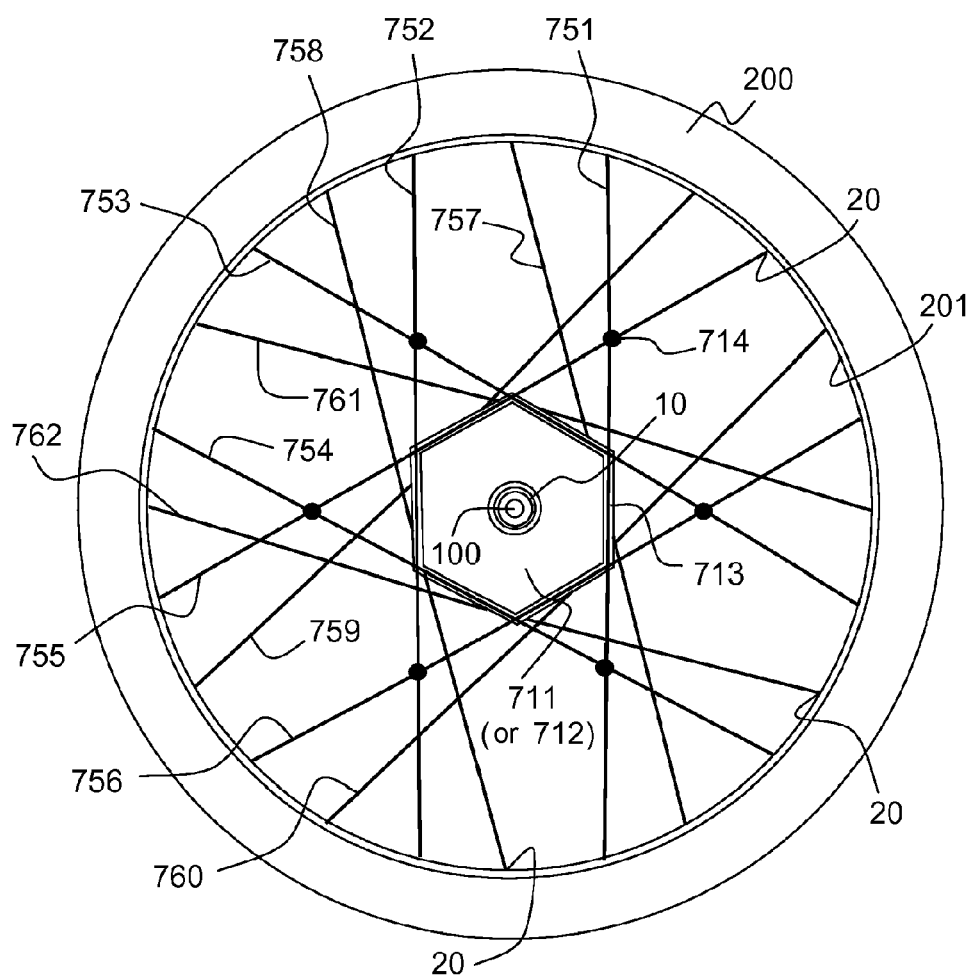
FIG. 7 shows schematically, in front view, a wheel according to a second example of the invention.

In the example illustrated in FIG. 7, the arrangement includes three sets of two rim-hub-rim connecting elements on the two flanges of the hub 10, wherein each rim-hub-rim connection element includes a rod having both its ends attached to the rim and a central portion attached to the hub.

In the examples described hereafter, the arrangement of connecting elements is offset on one side of the hub relative to that on the side so that all the attachment points (or connections) of the elements to the rim are distributed in a balanced manner with respect to the moments of the forces exerted.

First Example

FIGS. 2 and 3

In this exemplary embodiment, the wheel comprises an identical arrangement of rim-hub-rim connecting elements on both flanges of the hub. This arrangement comprises precisely, in this example, two sets of two rim-hub-rim connecting elements, the set of connecting elements 51-52; 53-54 and the set of connecting elements 55-56; 57-58 for the left side and, for the right side, the set of connecting elements 59-60; 61-62 and the set of connecting element 63-64; 65-66. For each flange, each connecting element of one of the sets crosses perpendicularly a connecting element of the other set. Moreover, the connecting elements of each set are in planes parallel to the axle of the wheel and located on either side of said axle. Thus, the arrangement proposed according to this example includes, for each set, rim-hub-rim connecting elements wherein each element includes two opposing spokes, said opposing spokes are situated in parallel planes on either side of the axle of the wheel and parallel to said axle 100. In addition, the spokes are attached on flanges of the hub the shape whereof allows attachment remote from the axle compared to spokes mounted on conventional wheels. According to the proposed arrangement, the opposing spokes are thus separated from the axle by a distance greater than the distance normally encountered for existing wheels. Indeed, this distance is substantially equal to 71 mm for a rim with a profile A equal to 38 mm (that is a width A of 38 mm) or equal to 75 mm for a rim with a profile equal to 27 mm or 60 mm for a rim with a profile equal to 88 mm while, conventionally, this distance is of the order of 20 to 30 mm. With existing wheels, mounting the spokes in opposition would only be possible with respect to the axle of the hub, and this is not an option, and is even less an option on the rear wheels due to the torque which would be added to the force due to pedaling.

Thus, attachment of the spokes to the hub is offset relative to the axle of the wheel and this is advantageously obtained by the form of the flanges. The hub has flanges having a diameter or width greater than the diameter of ordinary hubs.

In more detailed fashion, FIGS. 2 and 3 show a wheel in front view comprising an axle 100, a rim: 200, an inner rim perimeter 201, a hub 10, a left flange 11 of the hub 10, a right flange 12 of the hub. In this exemplary embodiment, each flange comprises a circular portion mounted on the axle of the wheel and equipped with vanes designated, for the left side flange: 110-111-112-113 and for the right side vanes: 120-121-122-123. The spokes are attached to the ends of the vanes of each flange. The attachment points are remote from the axle. This separation is substantially 60 mm to 75 mm depending on the width selected for the rim of the wheel, while it is conventionally 20 to 30 mm.

The spokes on the left side are designated: 51-52; 53-54; 55-56; 57-58 and the spokes on the right side are designated: 59-60; 61-62; 63-64; 65-66, this numbering indicating that the pairs are opposing spokes: as for example spoke 51 is in opposition with spoke 52; spoke 53 is in opposition with spoke 54, etc.

Each spoke on the left side is attached by an attachment point 41 to a vane of the left flange and by an attachment point 20 on the inner edge of the rim. To simplify, all the attachment point of the spokes to the inner perimeter of the rim 201, whether said spokes start at the left or right flange, carry the same reference symbol 20. Said attachment points are formed for example in the conventional and known manner, to with by a thread on the end of the spokes cooperating with a tension adjustment screw in the rim. The spoke-rim connection is thus amenable to disassembly.

Each left spoke is fixed by an attachment point 42 to a vane of the left flange. All the attachment points of the spokes to the vanes have this same reference symbol.

The spoke 51 is fixed on the vane 110 and the spoke 52 is fixed on this same vane 110. The spoke 53 is fixed on the vane 112 and the spoke 54 is fixed on this same vane 112.

The spoke 55 is fixed on the vane 113 and the spoke 56 is fixed on this same vane 113. The spoke 57 is fixed on the vane 111 and the spoke 58 is fixed on this same vane 111.

Each spoke on the right side is fixed by an attachment point 41 on a vane of the right flange. All the attachment points of the spokes to the vanes have the same reference symbol.

The spoke 59 is fixed on the vane 122 and the spoke 60 is fixed on this same vane 122. The spoke 61 is fixe on the vane 121 and the spoke 62 is fixed on this same vane 121.

The spoke 63 is fixed on the vane 120 and the spoke 64 is fixed on this same vane 120. The spoke 65 is fixed on the vane 123 and the spoke 66 is fixed on this same vane 123.

The arrangement described can also comprise additional spokes. On the left side, the additional spokes are designated 71-72; 73-74 and on the right side, the additional spokes are designated 75-76; 77-78. All these additional spokes have a radial attachment to the axle toward the rim. Advantageously, these additional spokes are attached along a medial between each vane of the hub. These supplementary spokes are shorter than the spokes attached to the ends of the vanes of the hub. Adding these spokes makes it possible to reinforce rigidity.

The following table is given by way of an example for several rim widths (in mm).

In this table, the distance A corresponds to the width of the rim, the distance B corresponds to the length of an additional spoke connecting a median point 43 between two vanes (FIG. 2, FIG. 3 or FIG. 4) and the distance C corresponds to the length of the opposing spokes. As for example 51 or 52.

| A | B | C |
|---|---|---|
| 24 | 262 | 281 |
| 38 | 248 | 267 |
| 50 | 237 | 255 |
| 88 | 198 | 218 |

Figure 4:
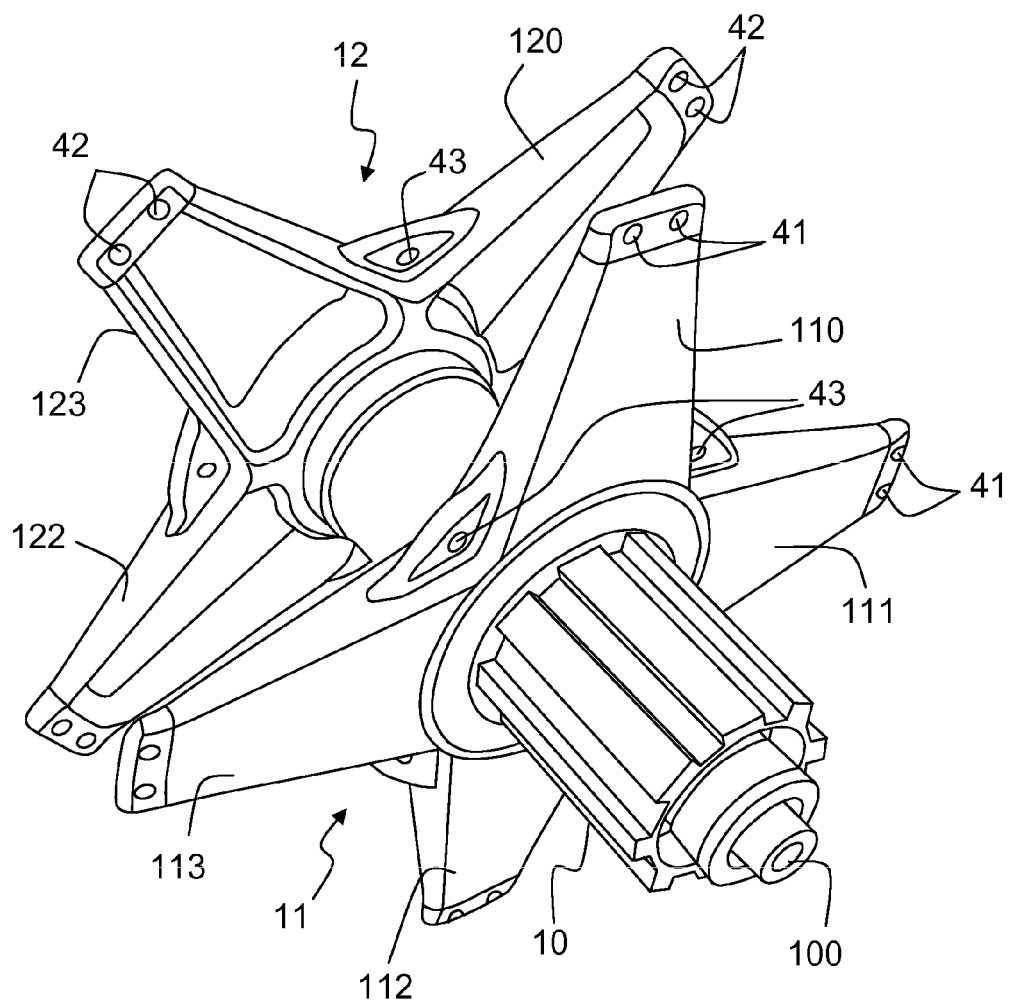
FIG. 4 shows schematically in perspective view, a first embodiment of the hub.
Figure 5:
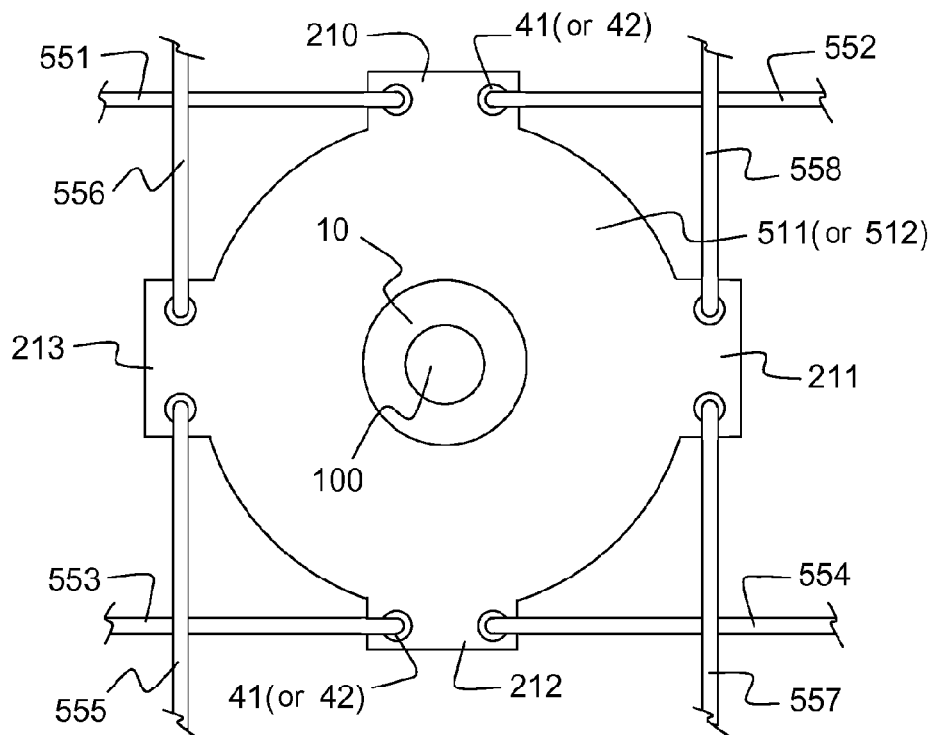
FIG. 5 shows schematically, in front view, a second embodiment of the hub.
Figure 6:
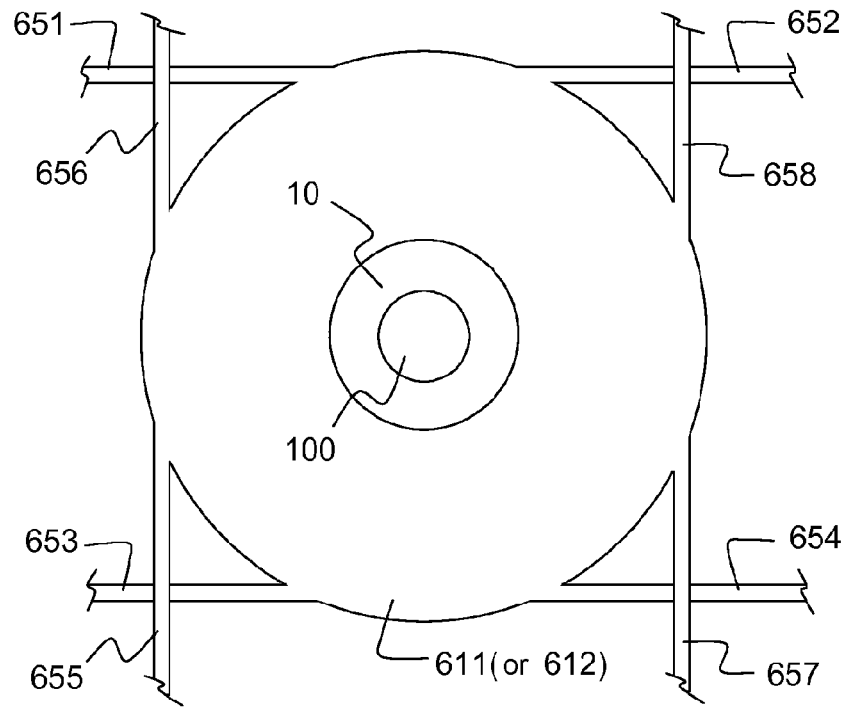
FIG. 6 shows schematically, in front view, a third embodiment of the hub.

FIGS. 4, 5 and 6 illustrate three variant embodiments of the hub.

In FIG. 4, the hub 10 comprises, according to a first variant, two flanges each consisting of a cross-shaped part 11, 12 equipped with four vanes 110 to 113; 122 to 123. The end of each vane comprises two perforations 41 on the left flange and 42 on the right flange. These perforations make it possible to pass the spokes when assembling the wheel and to attach them to the hub. The spokes are placed in opposition, two by two, tangentially to the axle of the hub. The spokes are locked after their passage, this in known fashion, by their end which exhibits a flattened head. The spokes are thus attached to the hub. Each cross-shaped part 11 and 12 further comprises, in the hollows between two vanes, a perforation 43 allowing passage of the additional spokes fixed radially to the rim 200.

The flanges of the hub consist of a single part made in the shape of a cross by machining from a mechanically strong material such as for example an aluminum alloy such as for example Zycral aluminium. The diameter of the flanges is calculated according to the profile of the rim so that each spoke is coaxial with another spoke with an angle of 180°. This cross-shaped part makes is possible to position the spokes in perfect opposition tangentially to the hub and not in its center. Thus, the spokes can be positioned in opposition two by two, while forming a rim-hub-rim connection remote from the center, that is remote from the axle.

In FIG. 5 is shown the implementation of a flange 41 or 42 of a hub 10 according to a second variant. This flange is seen in front view. In this example, the flange 11 (or 12) comprises a circular part 511 (or 512) comprising four radially opposed fins 210 to 213. Each fin comprises two perforations 41 (or 42), each allowing passage of a spoke designed to be in opposition and tangential to the axle. The spokes 551 to 557 are each passed through a perforation and thus attached to the hub. To this end, the spokes have a flattened end which retains them after passage in the perforation. On assembly, the spokes are oriented so as to be in opposition, two by two, and tangential to the axle of the hub and to the hub.

In FIG. 6 is shown the implementation of a flange 41 or 42 of a hub according to a third example. This example is similar to the example of FIG. 5. The flange is viewed from in front and comprises a circular part 611 (or 612) equipped with extensions 651 to 657. These extensions constitute spokes tangential to the axle of the hub. The extensions are made in the periphery of the central part so as to form two sets of two pairs of spokes, the spokes of each pair being in opposition.

In these two variants, the spokes can be positioned in opposition two by two, while forming a rim-hub-rim connection remote from the center, that is remote from the axle. Only this configuration makes it possible to ensure perfect equilibrium of the tensions and to resist the forces induced by pedaling.

Second Example

FIG. 7

In this exemplary embodiment, the wheel comprises three sets of connecting elements wherein each connecting element comprises a rod, respectively designated 751 to 756 for flange 711 and 757 to 762 for the other flange 712 (not visible). The rods are attached at their ends to the perimeter 201 of the rim 200. Each rod comprises a thread at its end which cooperates with a thread at each point of attachment 20 on the rim. Each rod 751 to 756 and 757 to 762 further comprises a median portion attached to the flanges, 711 and 712 respectively, of the hub 10.

The flanges 711 (or 712) consist advantageously of a part in the shape of a regular hexagon. Each side of the hexagonal part comprises, on its six edges, a groove 713 or recess, designed to accommodate a rod. The median portion for each rod 751 to 756 and 757 to 762 is inserted into a groove and glued. The rim is no longer pulled but rather pushed by each point of the hexagon with a continuity of motion that eliminates dead time.

To increase the rigidity of the rods, ties 714 are provided on the rods crossing over one another.

Preferably, the rods 751 to 756 and 757 to 762 are hollow.

Just as in the first example, the wheel thus made makes it possible to cancel the tension-compression effect which usually ovalizes wheels, and thus keep it in its original perfect shape without any distortion. The use of rods and of a hub made of carbon composite also allows a significant reduction in weight with the proposed arrangement.

Such a wheel made of carbon composite meets current needs for performance improvement by weight reduction with in addition an improvement in efficiency brought about by the proposed arrangement which makes it possible to apply strong tensions (synonymous with increasing efficiency).

Moreover, the wheel comprises removable rods and the tensions can be adjusted thanks to the ends which comprise a thread cooperating with screws in the rim. The screws are preferably made of titanium. The rods can in fact be disassembled by un-gluing their central portion and unscrewing their ends.

This exemplary embodiment makes it possible to have a wheel made of carbon composite that can be disassembled and is consequently repairable, with high efficiency.

In all the examples described, the flanges of the hub can be obtained in a single injection molding operation or by stamping. The wheel according to the invention is particularly designed for assembling wheels for high-end bicycles.

LIST OF REFERENCE SYMBOLS IN THE DRAWINGS

FIGS. 1, 2 and 3:
Axle: 100
Rim: 200
Inner perimeter of rim: 201
Hub: 10
Attachment points to the rim: 20
Left flange of the hub: 11
Right flange of the hub: 12
Left flange vanes: 110-111-112-112
Right flange vanes: 120-121-122-123
Attachment points on left flange vanes: 41
Attachment points on right flange vanes: 42
Attachment points on the rim 20
Left side spokes: 51-52; 53-54; 55-56; 57-58
Right side spokes: 59-60; 61-62; 63-64; 65-66
Additional spokes, left side: 71-72; 73-74
Additional spokes, right side: 75-75; 77-78
Attachment points of additional spokes: 43
FIG. 5
Left side flange: 511
Right side flange: 512
Left side fins: 210 to 213
Right side fins: 220 to 223
FIG. 6
Central portion of hub, left side: 611
Central portion of hub, right side: 612
Tangential extensions to the central portion of the hub: 651-652; 653-654; 655-656; 657-658.
FIG. 7
Left side flange: 711
Right side flange (not visible in the figure): 712
Left side rods: 751, 752, 753, 754, 755, 756.
Right side rods: 757, 758, 759, 760, 761, 762.
Attachment groove, left side: 713
Attachment groove, right side not visible
Ties: 714
Attachment points on the rim: 20

The invention claimed is:

1. A wheel of a bicycle wheel type, comprising:
   a rim;
   a hub with an axle corresponding to an axle of the wheel, said hub comprising a left flange and a right flange; and
   a system of rim-hub-rim connecting elements on the flanges of the hub, said system comprising at least two sets that are mutually perpendicular of at least three rim-hub-rim connecting elements, said at least three rim-hub-rim connecting elements of each set being in planes located on either side of the axle of the wheel and parallel to said axle of the wheel, each rim-hub-rim connecting element comprising one of (i) two opposing spokes each having one end attached to the rim and one end attached to the hub, and (ii) a rod having both of its ends attached to the rim and a central portion attached to the hub, so that each set of two connecting elements of the flanges includes at least four opposing spokes in pairs, each of the at least four spokes having a first end attached to the flange or to the other flange of the hub and a second end attached to the rim, wherein the system of rim-hub-rim connecting elements is identical on the right and left flanges of the hub, but offset in angle about the axle of the wheel so that the rim-hub-rim connecting elements are not facing one another, wherein each flange includes a single part comprising a central portion placed on the axle of the wheel having four extensions in the form of vanes forming a cross and medial portions between adjacent vanes, each vane comprising, at its end opposite to the axle of the wheel, perforations for attaching opposing spokes allowing remote positioning of the connecting elements relative to the axle of the wheel, and at least one rib-hub-rim connecting element is attached to at least one of the flanges at a medial portion of the flange.

2. The bicycle wheel according to claim 1, wherein the system of rim-hub-rim connecting elements comprises two sets of two rim-hub-rim connecting elements.

3. The bicycle wheel according to claim 1, wherein the remote positioning of the connecting elements relative to the axle of the wheel on said flanges is from 60 mm to 75 mm, 60 mm for a wheel having a rim profile equal to 88 mm, and 75 mm for a rim profile equal to 27 mm.

4. The bicycle wheel according to claim 1, wherein the ends of the spokes or of the rods attached to the rim are threaded, allowing attachment or detachment of said spokes or rods.

5. The bicycle wheel according to claim 1, wherein the hub comprises an attachment system configured to cooperate with the spokes or the rods to allow attachment or detachment of said spokes or rods.

6. The bicycle wheel according to claim 1, wherein the rim, the hub, the spokes and the rods are made of light alloy or of carbon composite material.

7. The bicycle wheel according to claim 1, wherein the spokes and the rods are hollow tubes.

\* \* \* \* \*